US008036970B1

(12) United States Patent
Gledhill et al.

(10) Patent No.: US 8,036,970 B1
(45) Date of Patent: Oct. 11, 2011

(54) ASSET MANAGEMENT RECONCILIATION SYSTEM AND METHOD

(75) Inventors: Derek M. Gledhill, Eden Prairie, MN (US); Andrew J. Start, Plymouth, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 1179 days.

(21) Appl. No.: 10/756,090

(22) Filed: Jan. 13, 2004

(51) Int. Cl.
*G06Q 40/00* (2006.01)
(52) U.S. Cl. .......................................... 705/36 R; 705/35
(58) Field of Classification Search ................ 705/35
See application file for complete search history.

(56) References Cited

U.S. PATENT DOCUMENTS

| | | | | |
|---|---|---|---|---|
| 6,662,164 | B1* | 12/2003 | Koppelman et al. | 705/14.13 |
| 7,249,075 | B1* | 7/2007 | Altomare et al. | 705/35 |
| 2002/0032626 | A1* | 3/2002 | DeWolf et al. | 705/35 |
| 2002/0042764 | A1* | 4/2002 | Gardner et al. | 705/35 |
| 2002/0143682 | A1* | 10/2002 | Bergmann et al. | 705/36 |
| 2003/0225663 | A1* | 12/2003 | Horan et al. | 705/36 |

OTHER PUBLICATIONS

Edward Troup. Corporation tax reform; British Tax Review. London: 2003. , Isss. 6; p. 437.*
Guidelnes hep couples divide marital assets; Chicago Sun-Times. Chicago, III. : Jun. 14, 1987. p. 5.*
Measuring economic profit and obsolescence; John R Cesta. Journal of Property Tax Management. new York: Fall 200. vol. 12, Iss. 2; p. 41, 11 pgs.*

* cited by examiner

*Primary Examiner* — Hani M Kazimi
*Assistant Examiner* — Hatem Ali
(74) *Attorney, Agent, or Firm* — Snell & Wilmer L.L.P.

(57) ABSTRACT

A system and a method of managing and reconciling changes in the cost basis for assets is provided. More specifically, the system and the method allow asset management advisors to provide clients with investment portfolio information that is complete and accurate. Specifically, the present system and the method allow cost basis data and tax lot data to be extracted from brokerage systems and other financial instrument administration systems to enable automated reporting of changes to cost basis changes for an individual's portfolio of assets.

7 Claims, 1 Drawing Sheet

ASSET MANAGEMENT RECONCILIATION SYSTEM AND METHOD

TECHNICAL FIELD

A system and method of automatically obtaining cost basis changes to assets are provided. More specifically, the system and method provide individuals or asset management advisors with investment portfolio information that is complete and accurate. Specifically, the present system and method allow cost basis data and tax lot data to be extracted from various product systems and other financial instrument administration systems to enable automated calculation of cost basis changes for, for example, capital gains tax purposes.

BACKGROUND

Typically, brokerage account holders move assets and change asset ownership at will, especially since many brokerage account holders have easy access to their accounts via communication means, such as via the telephone and/or personal computers via the internet. Moreover, brokerage account holders can buy additional assets, sell a portion of a holding or specify an accounting methodology at the time of sale or otherwise at the time of the change in the condition of the asset. Financial representatives, acting on behalf of the owner may also make these transactions on behalf of the owner.

These owner-generated transactions create inconsistencies in the way cost basis is calculated for their holdings. Moreover, these transactions make the complete and accurate accounting and reporting of cost basis very difficult. Specifically, the gains and losses on investment holdings are often incorrectly reported.

Similarly, actions by corporations and mutual fund companies can often result in reorganizations that can create complex changes to clients' asset and investment portfolios. In addition, the complex tax laws can affect the cost basis of an asset and how the cost basis is calculated.

To solve the problem of calculating asset cost basis when the ownership of the asset changes, portfolio owners can use tools such as Quicken that can accept cost basis changes that are individually crafted and manually entered by them. Typically, the ownership of an asset can change when the asset is sold, transferred, when actions by corporations and mutual funds result in reorganizations that can create changes to clients' assets, or when complex tax laws affect cost basis. For example, small brokerage houses have the capability of manually entering this information. Larger brokerage and financial planning institutions, however, have not been able to consistently use a combination of good data and automated tools to create accurate cost bases for assets without using large amounts of manual labor.

Moreover, solutions that require individuals to manually record and calculate accurate cost basis changes for assets do not attempt to deal with both corporate and client-driven portfolio changes. In addition, solutions that provide for complete automatic reconciling of cost basis changes for assets typically utilize "force balancing" techniques that assume that reporting of cost basis changes and gains of assets do not need to balance precisely. In essence, the various methods utilized to solve the problem of reconciling cost basis changes of assets either require too much manual labor to get complete and accurate results or do not provide accurate and complete reconciliation, categorization and calculation.

Other solutions include simply not providing clients with cost basis information or allowing clients' financial advisors to track this information. However, these solutions do not provide the types of services generally desired by individuals or financial representatives.

A system and a method, therefore, are needed that can automatically calculate and reconcile cost basis changes when assets are sold or otherwise reallocated in an account or a plurality of accounts. Moreover, a system and a method is needed that can completely and accurately provide for cost basis changes for assets without requiring large amounts of manual labor. In addition, a need exists for a system and a method that can solve the other various problems enumerated above.

SUMMARY

A system and a method of managing and reconciling assets are provided. More specifically, the system and the method allow asset management advisors to provide clients with investment portfolio information that is complete and accurate. Specifically, the present system and method allow cost basis data and tax lot data to be extracted from brokerage systems and other financial instrument administration systems to enable automated reconciliation of cost basis changes.

To this end, in an embodiment provided herein, a method of calculating asset cost basis is provided. The method comprises the steps of providing an asset, the ownership of which is tracked in a product system, reallocating the ownership of the asset, categorizing the reallocation of the asset into one of a plurality of categories, providing a management system for extracting the information on the asset, the reallocating of the ownership of the asset and the categorization of the reallocation of the ownership of the asset from the product system, and automatically calculating the cost basis change of the asset based on the categorization of the reallocation of the ownership of the asset in the management system.

The method further comprises the step of codifying the categorization of the reallocation of the ownership of the asset prior to automatically calculating the cost basis change of the asset. Typically, the product system is an account. More specifically, the reallocation of each asset is categorized by the reason for the reallocation.

The method further comprises the step of analyzing the information relating to the asset, the reallocation of the ownership of the asset, and the categorization of the reallocation of the ownership of the asset to automatically calculate the cost basis change of the asset.

The method further comprises the step of automatically calculating the cost basis change for the asset based on the information extracted by the management tool. In addition, the method of claim 1 further comprising the steps of providing a portfolio having a plurality of assets distributed in one or a plurality of product systems, reallocating the ownership of a plurality of the assets, categorizing the reason for the reallocation of the ownership of each of the assets, and automatically calculating the cost basis change of each of the assets based on the categorization of the reason for the reallocation of the ownership of the asset in the management system.

In addition, the method further comprises the step of preparing a report relating to the cost basis change of the asset based on the categorization of the change in the ownership of the asset. Moreover, the method further comprises the steps of reconciling the cost basis change of the asset to the product system, and preparing a report relating to the cost basis change of the asset. In addition, the method further comprises the step of utilizing tax lot information to more accurately determine cost basis change relating to the reallocation of the asset.

In an alternate embodiment described herein, a system for calculating asset cost basis changes is provided. The system comprises a product system, an asset wherein the ownership of the asset is reallocated and tracked in the account, means for extracting information from the account relating to the reallocation of the ownership of the asset via a management system, and means for calculating the cost basis change of the asset based on the reallocation of the asset. The system further comprises means for categorizing the reallocation of the ownership of the asset.

Moreover, the categorization of the reallocation of the ownership of the asset relates to the reason for the reallocation of the ownership of the asset. In addition, the means for categorizing the reallocation of the ownership of the asset categorizes the asset into one of a plurality of categories based on the reason for the reallocation of the ownership of the asset. Further, the means for calculating the cost basis change of the asset based on the reallocation of the ownership of the asset automatically calculates the cost basis change of the asset based on the information extracted from the account. Still further, the information extracted from the account relates to reasons for reallocating the ownership of the asset.

The system of the alternate embodiment described herein further comprises means for analyzing the information extracted from the account relating to the asset prior to calculating the cost basis change of the asset. Moreover, the system further comprises a portfolio comprising a plurality of assets in the account or a plurality of accounts and means for calculating the cost basis change of each of the plurality of assets. Further, the system comprises means for extracting information from the plurality of assets in the account via the management system. Still further, the means for calculating the cost basis change of each of the plurality of assets is done automatically.

More specifically, a system and a method are provided that completely and accurately calculates cost basis changes for assets after the assets are sold or otherwise reallocated, whether the assets are distributed in a plurality of separate product systems or accounts. Moreover, the system and the method calculates and reconciles cost basis changes for assets that are mostly or completely automatic and does not require large amounts of manual labor for the complete and accurate reconciliation of the assets.

In addition, the system and the method of reconciling cost bases of assets do not require "force balancing" the cost bases of assets thereby requiring assumptions to be made regarding the cost basis changes. In addition, the system and the method of reconciling cost basis changes of assets are provided that can deal with both corporate and client-driven portfolio changes.

Additional features and advantages of the present invention are described in, and will be apparent from, the detailed description of the presently preferred embodiments.

DETAILED DESCRIPTION OF THE PRESENTLY PREFERRED EMBODIMENTS

Figure 1:
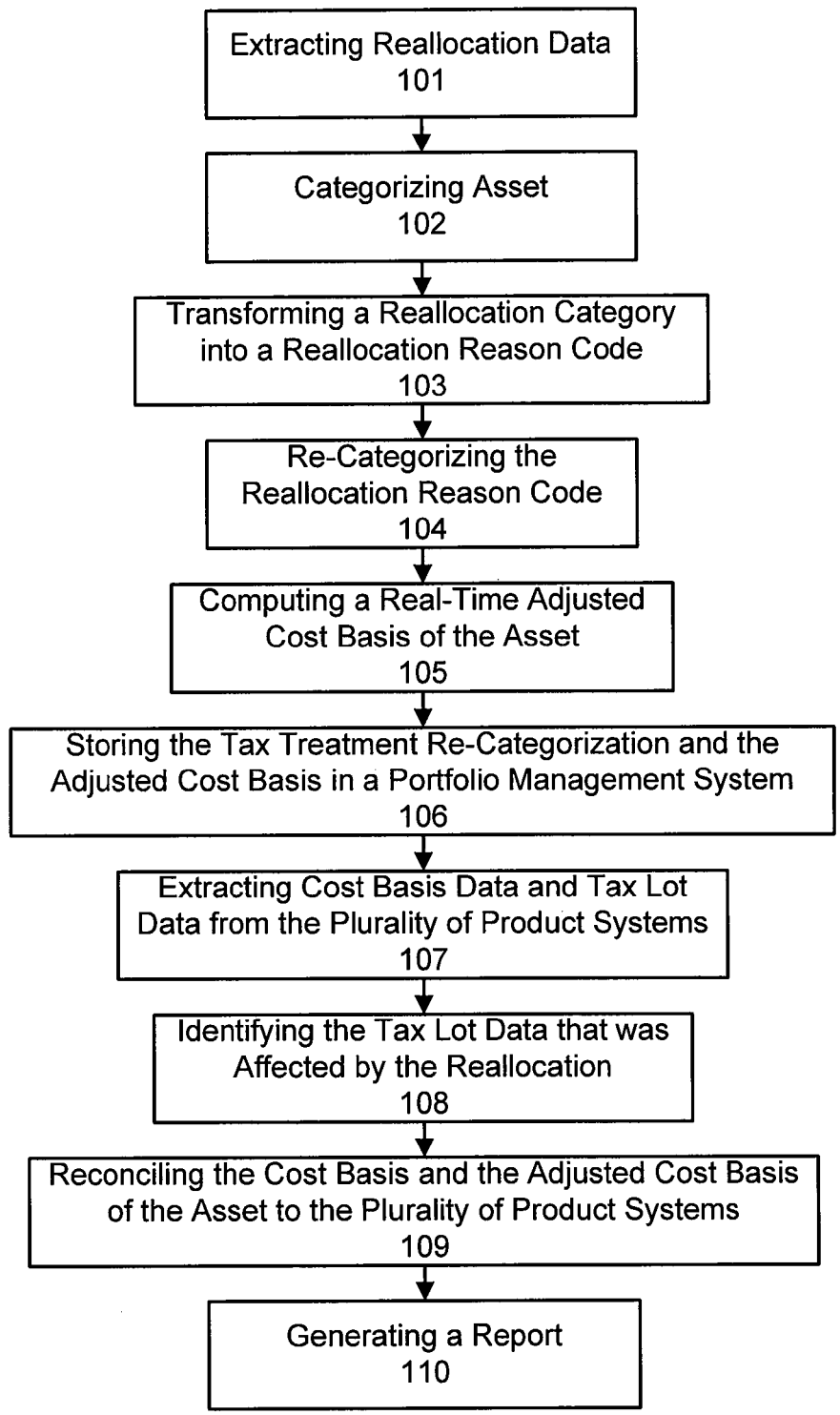
FIG. 1 is a flowchart of an exemplary method, in accordance with an embodiment of the disclosure.

A system and a method of managing and reconciling assets are provided. More specifically, the system and the method allow asset management advisors to provide clients with investment portfolio information that is complete and accurate. Specifically, the present system and method allow cost basis data and tax lot data to be extracted from product systems, such as brokerage systems and other financial instrument administration systems, to enable automated reconciliation of cost basis changes.

With respect to FIG. 1, in one embodiment, a method of automated real-time computing of cost basis of at least one asset comprises extracting, by a computer for computing said cost basis of said at least one asset and from a product system, reallocation data associated with a reallocation of an ownership of the asset, wherein the asset is a financial asset (Step 101), and wherein the product system is one of a plurality of product systems from which reallocation data is extracted in real time, and wherein the reallocation data comprises of reallocation reasons, an asset type and a reallocation value, and wherein the reallocation value comprises information relating to the value of the change in ownership of the asset, and wherein the reallocation of the ownership of the asset by the product system is triggered by at least one of: a marriage, an inheritance, a gift, a partial spin-off, a stock split with owner option, a partial sale of the asset, and a change to an accounting method for the sale of the asset. The system also categorizes at least one asset into at least one of the reallocation categories based on the extracted reallocation data (Step 102) and transforms at least one reallocation category into at least one reallocation reason code (Step 103), wherein the reallocation reason code comprises codified information relating to the reason for the change in ownership of the asset. The system also re-categorizes, by the computer, the reallocation reason code into one of a plurality of tax treatment categories to establish a tax treatment re-categorization of the reallocation (Step 104), wherein the reallocation was firstly categorized, by the product system, into one of a plurality of reallocation categories, and wherein the tax treatment re-categorization is based upon the reallocation reason code, the reallocation reasons, and the asset type and is associated with a tax treatment of the reallocation. The system also computes automatically, by the computer, a real-time adjusted cost basis of the asset based upon the reallocation reason code, the reallocation reasons, the asset type, and the tax treatment categorization (Step 105). The system also stores, by the computer, the tax treatment re-categorization and the adjusted cost basis in a portfolio management system to enable tax-related calculations based upon the tax treatment re-categorization (Step 106). The system also extracts, by the computer, cost basis data and tax lot data from the plurality of product systems to enable automated real-time reconciliation of the cost basis data and the adjusted cost basis (Step 107). The system also identifies, by the computer, at least a portion of the tax lot data that was affected by the reallocation (Step 108) and reconciles real-time, by the computer and based upon the tax treatment re-categorization, the cost basis data and the adjusted cost basis of the asset to the plurality of product systems (Step 109). The system also generates a report, by the computer, relating to the adjusted cost basis of the asset based on at least one of: the reallocation reason code, the tax treatment re-categorization and the adjusted cost basis of the asset (Step 110).

Specifically, when a client requests a change of ownership of an asset in an account, the client typically has a reason for the change. Examples of reasons for changing asset allocation include marriage, inheritance, gifting, or other reasons that affect the way that the cost basis of the asset has to be accounted for capital gains tax purposes or for other purposes.

The reasons for changing asset allocations are carefully captured and categorized by the present invention.

Moreover, many corporate actions, such as, for example, stock splits, mergers or changes of the Committee on Uniform Securities Identification Procedures (CUSIP) number can be relatively simple. The handling of such matters in portfolio reporting systems can be easily automated. However, more complex reorganizations, such as, for example, partial spin-offs and stock splits with owner options, can create incomplete or inaccurate cost basis and gain reporting. Moreover, incomplete or inaccurate cost basis reporting can occur due to the purchase of additional assets, partial sale of an asset, or the specification of specific accounting methodology for a sale of an asset or assets.

The capturing and categorizing of the various changes in the ownership of an asset or assets result in the codification of these actions, and the present invention applies these reasons, along with the information relating to the change of the asset, as data feeds that are input into a product system, such as a brokerage system or a financial instrument administration system, comprising a database or a plurality of databases for storing information relating to the asset or assets. If clients only invested money in one product system, the amount of money calculated and the cost basis changes for the change in the conditions of the asset or assets would be relatively simple. However, clients may have assets in an investment portfolio distributed over a broad range of product systems contained in many separate databases. For example, a client may invest in one particular product only to sell all or a portion of the product at a later date. Moreover, the client may then buy a completely different product.

To track changes in a client's investment portfolio spread over many product systems, a single system or application, known as a portfolio management tool ("PMT") incorporates information about the client's investment portfolio in a single database. With the data consolidated in one system (i.e., the PMT), the client may easily track his investment portfolio and easily and accurately obtain values for the changes in cost basis for his or her asset or assets for tax reporting purposes or other like purposes. It is, to therefore, necessary that the data within the PMT correctly reflect the data within each of the individual product systems.

Therefore, in an embodiment of the present invention, the PMT extracts data from the databases of the product systems. The data contained in the product systems contains codified information relating to not only the value of the change in the ownership of the asset, but the reason for the change. For example, if an asset was gifted as an inheritance, the reason for the change in the ownership of the asset would be chronicled and a code would be established and linked with the information relating to the value of the change in the ownership of the asset. The codification of the reason for the change in the ownership of the asset may occur as a prompt by the product system to the client or client representative, who then is required to input the reason for the change in the ownership of the asset when the change in the ownership of the asset is accomplished in the product system.

The PMT then extracts or otherwise gathers all detailed and codified information in all transactions that may affect assets in a particular portfolio from the databases in the various product systems. Typically, the PMT may extract the data from the databases of the product systems via daily or otherwise periodic data feeds from the databases of the product systems. The data feeds may be via batch files transferred via a storage devices. Alternatively and preferably, the data feeds may be transferred over a network, such as the Internet, an intranet, or other type of computer network. The data feeds transferred via the network may either be in batch files, near real time, or, preferably, real time data feed transfers.

As noted above, in order to maintain accurate cost basis changes, information relating to the reason for the change in ownership of the asset is necessary. The codified information is linked with the data on the value of the change in the ownership of the asset in the database of the product system. When the data feed with the value of the change in the ownership of the asset and the codified information relating to the reason for the change in the ownership of the asset is extracted or otherwise fed to the PMT, the information is read by the PMT, which interprets the information and determines how to process the transaction and calculate the cost basis correctly based on the type of asset and the reason for the change in the ownership of the asset.

Second, the PMT conducts an open lot or close lot data extraction from the product systems. The PMT may utilize the information to determine and identify which lots or portions thereof, were sold or liquidated thereby helping the PMT correctly report cost basis.

Third, individual product systems may also calculate cost basis changes on open lots or holdings. The PMT may periodically extract the cost basis changes for these open lots and/or holdings as calculated in the product systems to refresh the calculated cost basis within the PMT. Therefore, the cost basis changes for the transactions are reconciled between the product systems and the PMT, therefore providing error-free reporting of the cost basis whether from the PMT or the individual product systems.

Finally, reports can be generated from the PMT relating to the cost basis changes of the assets in an individual's entire portfolio. It is, therefore, not necessary to individually obtain or calculate the information in each product system. In addition, an individual's representative may obtain the information relating to the individual's entire portfolio from the PMT.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method of automated real-time computing of cost basis of at least one asset comprising:
   monitoring, by a computer, the reallocation of an ownership of at least one asset from a plurality of assets, wherein the asset is a financial asset;
   extracting in real time, by the computer and from at least one product system, reallocation data, asset information, and computed tax data associated with a the reallocation of the ownership of at least one asset,
   wherein the reallocation data comprises of reallocation reasons, and a reallocation value,
   and wherein the reallocation value comprises information relating to the value of the change in ownership of the asset,
   and wherein the reallocation of the ownership of the asset by the product system is triggered by at least one of: a marriage, an inheritance, a gift, a partial spin-off, a stock split with owner option, a partial sale of the asset, and a change to an accounting method for the sale of the asset;
   categorizing, by the computer, at least one asset into at least one of the reallocation categories based on the extracted reallocation data;

transforming, by the computer, at least one reallocation category into at least one reallocation reason code, wherein the reallocation reason code comprises codified information relating to the reason for the change in ownership of the asset;

re-categorizing, by the computer, the reallocation reason code into one of a plurality of tax treatment categories to establish a tax treatment re-categorization of the reallocation of the ownership of at least one asset, and wherein the tax treatment re-categorization is based upon the reallocation reason code, the asset information and the associated tax treatment of the reallocation;

computing automatically, by the computer, a real-time adjusted cost basis of at least one asset based upon the reallocation reason code, the asset information, and the tax treatment re-categorization;

storing, by the computer, the tax treatment re-categorization and the adjusted cost basis in a portfolio management system to enable tax-related calculations based upon the tax treatment re-categorization;

extracting, by the computer, cost basis data and tax lot data from at least one product system to enable automated real-time reconciliation of the cost basis data and the adjusted cost basis;

identifying, by the computer, at least a portion of the tax lot data that was affected by the reallocation;

reconciling real-time, by the computer and based upon the tax treatment re-categorization, the cost basis data and the adjusted cost basis of the asset to at least one product system; and, generating a report, by the computer, relating to the adjusted cost basis of the asset based on at least one of: the reallocation reason code, the tax treatment re-categorization and the adjusted cost basis of the asset.

2. The method of claim 1 further comprising codifying, by the computer, the tax treatment re-categorization of the reallocation of the ownership of the asset prior to automatically calculating the cost basis change of the asset.

3. The method of claim 2, wherein the product system is an account.

4. The method of claim 3, further comprising providing a portfolio having a plurality of assets distributed in the plurality of product systems.

5. The method of claim 4, further comprising utilizing the tax lot data to more accurately determine real-time cost basis change relating to the reallocation of the asset.

6. A host system comprising:
a tangible, non-transitory memory communicating with a processor,
the tangible, non-transitory memory having instructions stored thereon for calculating automated real-time computing of cost basis of an at least one asset, that in response to execution by the processor, cause the processor to perform operations comprising:
monitor, by a computer, the reallocation of an ownership of at least one asset from a plurality of assets, wherein the asset is a financial asset;
extract in real time, by the computer, from at least one a product system, reallocation data, asset information, and computed tax data associated with the a reallocation of the ownership of at least one asset,
wherein the reallocation data comprises of reallocation reasons, and a reallocation value,
and wherein the reallocation value comprises information relating to the value of the change in ownership of the asset;

and wherein the reallocation of the ownership of the asset by the product system is triggered by at least one of: a marriage, an inheritance, a gift, a partial spin-off, a stock split with owner option, a partial sale of the asset, and a change to an accounting method for the sale of the asset;
categorize at least one asset into at least one of the reallocation categories based on the extracted reallocation data;
transform at least one reallocation category into at least one reallocation reason code;
re-categorize the reallocation reason code into one of a plurality of tax treatment categories to establish a tax treatment re-categorization of the reallocation of the ownership of at least one asset, and wherein the tax treatment re-categorization is based upon the reallocation reason code, the asset information and the tax treatment re-categorization;
computing automatically a real-time adjusted cost basis of the asset based upon the reallocation reason code, the reallocation reasons, the asset type, and the tax treatment re-categorization;
store the tax treatment re-categorization and the adjusted cost basis in a portfolio management system to enable tax-related calculations based upon the tax treatment re-categorization;
extract cost basis data and tax lot data from at least one product system to enable automated real-time reconciliation of the cost basis data and the adjusted cost basis;
identify at least a portion of the tax lot data that was affected by the reallocation;
reconcile real-time, based upon the tax treatment re-categorization, the cost basis data and the adjusted cost basis of the asset to at least one product system; and,
generate a report relating to the adjusted cost basis of the asset based on at least one of: the reallocation reason code, the tax treatment re-categorization and the adjusted cost basis of the asset.

7. A method of automated real-time computing of cost basis of at least one an asset comprising:
monitoring, by a computer for computing said cost basis of said at least one asset, the reallocation of an ownership of at least one asset from a plurality of assets, wherein the asset is a financial asset;
extracting in real time, by the computer, from at least one product system, reallocation data associated with a reallocation of an ownership of the asset,
and wherein the reallocation data comprises of reallocation reasons, and a reallocation value,
and wherein the reallocation value, comprises information relating to the value of the change in ownership of the asset,
automatically categorizing, by the computer, at least one asset into at least one of the reallocation categories based on the extracted reallocation data;
automatically transforming, by the computer, at least one reallocation category into at least one reallocation reason code, wherein the reallocation reason code, comprises codified information relating to the reason for the change in ownership of the asset,
and wherein the reallocation of the ownership of the asset by the product system is triggered by at least one of: a marriage, an inheritance, a gift, a partial spin-off, a stock split with owner option, a partial sale of the asset, and a change to an accounting method for the sale of the asset;
automatically re-categorizing, by the computer, the reallocation reason code into one of a plurality of tax treatment categories to establish a tax treatment re-categorization of the reallocation of the ownership of at least one asset, and wherein the tax treatment re-categorization is based upon the reallocation reason code, the asset information and the associated tax treatment of the reallocation;

computing automatically, by the computer, a real-time adjusted cost basis of at least one asset based upon the reallocation reason code, the reallocation reasons, the asset information, and the tax treatment re-categorization;

storing, by the computer, the tax treatment re-categorization and the adjusted cost basis in a portfolio management system to enable tax-related calculations based upon the tax treatment re-categorization;

automatically extracting, by the computer, cost basis data and tax lot data from at least one product system to enable automated real-time reconciliation of the cost basis data and the adjusted cost basis;

automatically identifying, by the computer, at least a portion of the tax lot data that was affected by the reallocation;

automatically reconciling in real-time, by the computer and based upon the tax treatment categorization, the cost basis data and the adjusted cost basis of the asset to at least one product system; and, generating a report by the computer, relating to the adjusted cost basis of the asset based on at least one of: the reallocation reason code, the tax treatment re-categorization and the adjusted cost basis of the asset.

* * * * *